P. B. DELANY,

Assignor to DELANY PATENT TELEGRAPH RELAY CO.

Electro Magnet.

No. 9,708. Reissued May 17, 1881.

*Witnesses:*
*Tastall.*
*J. P. Thos. Laing*

*Inventor:*
*P. B. Delany*
*By Mason Fenwick*
*his attorney*

THE NORRIS PETERS CO., PHOTO-LITHO., WASHINGTON, D. C.

UNITED STATES PATENT OFFICE.

PATRICK B. DELANY, OF NEW YORK, N. Y., ASSIGNOR TO DELANY PATENT TELEGRAPH RELAY COMPANY, OF SAME PLACE.

ELECTRO-MAGNET.

SPECIFICATION forming part of Reissued Letters Patent No. 9,708, dated May 17, 1881.

Original No. 165,157, dated July 6, 1875. Application for reissue filed February 19, 1881.

*To all whom it may concern:*

Be it known that I, PATRICK B. DELANY, formerly of Jersey City, in the State of New Jersey, but now of the city of New York, in the State of New York, did invent certain new and useful Improvements in Electro-Magnets, which are more especially adapted for use as telegraphic relays, sounders, &c., of which the following is a specification.

The object of this invention is to furnish electro-magnets which shall operate more rapidly and energetically and with less frictional resistance than those heretofore in use.

To this end it consists in suspending a movable electric coil over one that is fixed. The core of one of these coils is made of such length that when bent up at each end at right angles to its length in the direction of the other coil its extremities shall pass beyond the core of this other coil, and on opposite sides thereof, as shown at *b b'*, Fig. 3 of the drawings.

In order that those skilled in the art may be enabled the better to understand, construct, and use my invention, the same will now be more particularly described.

Figure 1:
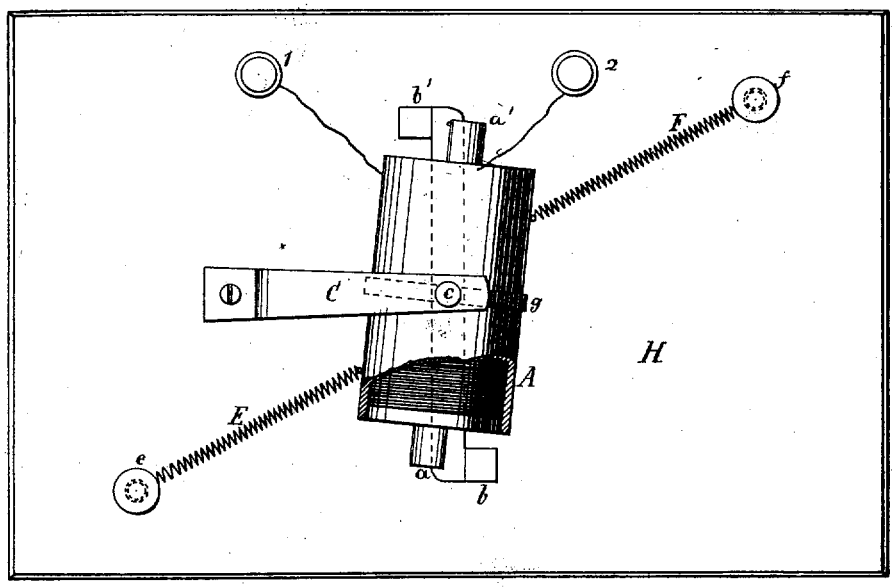
Figure 2:
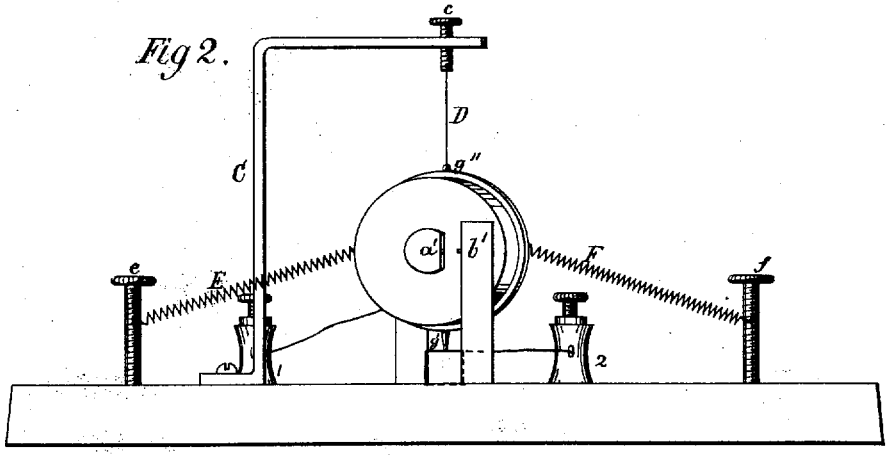
Figure 3:
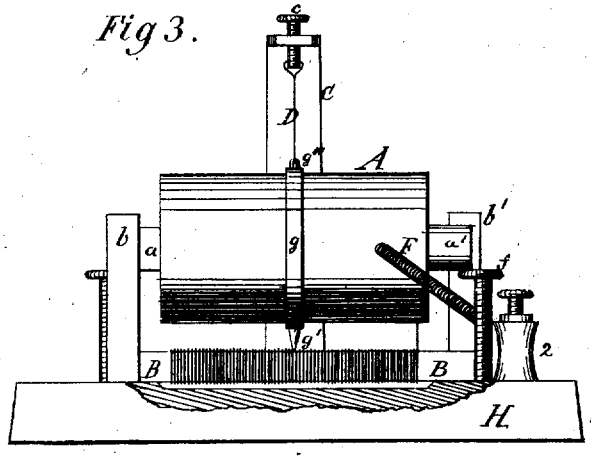

Figure 1 is a plan view, Fig. 2 an end view, and Fig. 3 a side view, of a relay embodying my invention.

Upon H, as a base, I securely fasten a magnet, B, with its core bent and terminating in *b b'*. The core of the magnet A is extended past the core of its fellow magnet, as shown at *a a'*. Around this coil A is fitted a hoop, *g*, having upon its lower side a pivotal projection, *g'*, and upon its upper side a hook, *g''*, in order that it may be suspended by the thread D from a screw in the bent arm C, attached to the base H. The coils of the two magnets are so wound that both shall be in the same circuit, and in such a manner that the adjacent ends of the two magnets shall be of opposite polarities. By this arrangement each of the poles at one end of the magnets attracts the other by its own *vis viva*, whereas an armature is inert until its polarity is excited as a secondary operation. The latter will therefore be less energetic than the former and operate more slowly. Added to this fact, also, is the action at the opposite poles of the two magnets, which will be at the same time acting in concert with their co-ordinates to increase their efficacy. Accordingly, experience has shown that a considerably less battery-power is needed to work one of these instruments than to operate an armature, all other things being equal; but what is of more consequence the action of the double magnet is more rapid and nimble than that of the single magnet operated by an armature. The latter device has to be polarized and depolarized at every operation, which requires time, and, although acting with surprising rapidity, is slow in comparison with the movements of its more active competitor.

Normally the coil A, or that which is movable, is made to swing its poles away from those of the fixed magnet by the use of one or two springs, E F, attached to the movable magnet, while 1 and 2 are the binding-posts for connecting the line of any other circuit to the magnet. Contact-points for closing another circuit may be placed at either end. They are shown at *a' b'*, Fig. 2.

From the foregoing description the operation will be readily understood. A current being passed through the coils, as one of these magnets is stationary, the poles of the other will be attracted by a quadruple force and with the least practicable amount of friction.

It is manifest that the various parts of the above-described arrangement may, in a great degree, be interchanged without affecting the principle on which they operate. Especially may the bent core be appended to the upper as well as to the lower magnet, and either may be rendered movable while the other is fixed.

Having thus described my invention, what I claim as new, and desire to secure by Letters Patent, is—

In a telegraph-relay, the combination of two electro-magnets in the same circuit, one of which is fixed while the other is suspended at a point between its two poles, so as to vibrate freely, substantially as described, and so that the extremities of its poles shall be respectively opposite the extremities of the poles of the fixed magnet, and shall be of opposite polarity thereto, whereby the greatest power of the current shall be utilized, substantially as and for the purposes set forth.

PATRICK B. DELANY.

Witnesses:

S. B. P. HIGGINS,

FRANK L. WARREN.